United States Patent [19]

Koishi et al.

[11] Patent Number: 4,875,093
[45] Date of Patent: Oct. 17, 1989

[54] ULTRAFAST CONTINUOUS IMAGING APPARATUS

[75] Inventors: Musubu Koishi; Yoshihiko Mizushima; Hirofumi Kan, all of Shizuoka, Japan

[73] Assignee: Hamamatsu Photonics Kabushiki Kaisha, Shizuoka, Japan

[21] Appl. No.: 251,595

[22] Filed: Sep. 30, 1988

[30] Foreign Application Priority Data

Sep. 30, 1987 [JP] Japan .................. 62-246894

[51] Int. Cl.⁴ .................. H04N 5/04; H04N 5/08
[52] U.S. Cl. .................. 358/83; 358/209; 358/901; 358/217; 313/524; 313/542
[58] Field of Search .............. 358/41, 160, 290, 901, 358/83, 217; 313/524, 537, 541, 542; 364/617

[56] References Cited

U.S. PATENT DOCUMENTS

| | | | |
|---|---|---|---|
| 2,140,695 | 7/1935 | Farnsworth | 358/217 |
| 4,232,333 | 11/1980 | Hiruma et al. | 258/209 |
| 4,661,694 | 4/1987 | Corcoran | 313/542 |
| 4,682,020 | 7/1987 | Alfano | 313/537 |
| 4,740,685 | 4/1988 | Koishi | 250/213 VT |

OTHER PUBLICATIONS

Bixby, J. A., "High–Speed Television Camera and Video Tape Recording System for Motion Analysis", Design of Digital Image Processing, Spie vol. 301, pp. 58–65, 1981.

Lee, Teh–Huang et al., "A Solid–State Image Sensor for Image Recording at 2000 Frames per Second", IEEE Transactions on Electron Device, vol. ed-19, no. 9, September 1982.

Primary Examiner—John W. Shepperd
Assistant Examiner—Michael D. Parker
Attorney, Agent, or Firm—Finnegan, Henderson, Farabow, Garrett & Dunner

[57] ABSTRACT

An apparatus continuous imaging apparatus comprising a camera portion and an image receiving portion, specifically, the image pickup portion comprises an image pickup tube that deflects and scans electron beams and allows electron signals correponding to one pixel or a one-dimensional array of pixels to be converted successively and continuously to time-series light signals. The image receiving portion comprises means that converts to electron beams the time-series light signals transmitted from the pickup tube through at least one optical fiber and which reproduces an image by deflecting the electron beams in synchronism with the camera portion.

6 Claims, 3 Drawing Sheets

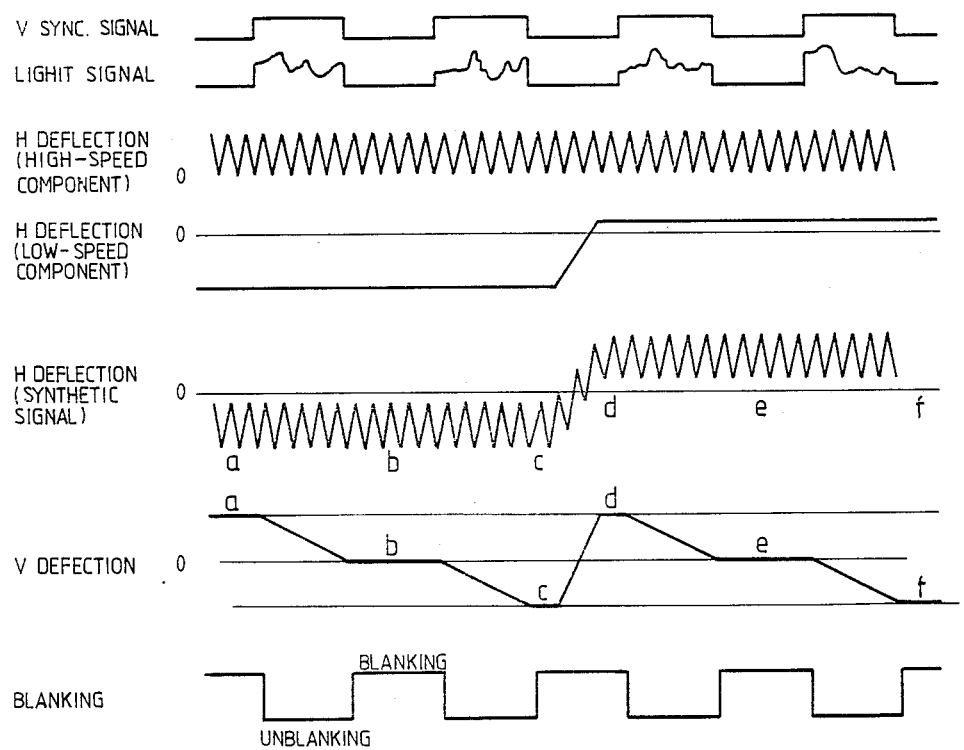

4,875,093

ULTRAFAST CONTINUOUS IMAGING APPARATUS

BACKGROUND OF THE INVENTION

The present invention relates to an ultrafast continuous imaging apparatus which is capable of continuously picking up a two-dimensionsal image of a high-speed phenomenon such as an explosion and which successively and continuously reproduces the image in a remote place.

A conventional system of continuous imaging comprises the steps of picking up an image with a broadcasting or industrial TV camera, performing A/D conversion on individual frames of output video signals from the TV camera, storing them in a frame memory, and successively transmitting the stored frames to a processing unit. Another conventional system is an image pickup device comprising PN junction photodiodes arranged in an array in the photosensor portion and a switching MOS transistor circuit for successively scanning the photodiode array. When a certain switching MOS transistor is turned on in response to a shift pulse from an X- (or Y-) direction shift register, the signal charges stored in the photodiode connected to that MOS transistor are picked up through a signal line. Also available is an image pickup device that employs a charge-coupled device (CCD) which has a thin oxide film formed on a silicon substrate, with a plurality of electrodes being arranged on the oxide film. When light is incident on the silicon substrate, an amount of charges that is proportional to the intensity of light is stored as an image signal in the potential well under an electrode and the stored charges are scanned to read the image signal.

A problem with the standard TV cameras is that their frame rate is as low as about 30 Hz. Even a high-speed image pickup device in which a two-dimensional solid-state image pickup device is divided into a plurality of segments to be read in parallel to each other achieves only a frame rate of no higher than about 2 kHz. The conventional devices with such low frame rates have been unable to faithfully pick up an image of an explosion or other momentarily changing phenomena. A further problem with these conventional high-speed image pickup devices is that they are incapable of real-time image reception in a remote area and that continuous image cannot be obtained.

SUMMARY OF THE INVENTION

An object of the present invention is to provide an ultrafast imaging apparatus that is capable of picking up an image at very high frame rates ranging from 100 kHz to 2 MEz. Another object of the present invention is to provide an ultrafast imaging apparatus that enables the obtained image to be received in a remote area with the attendant feature of accomplishing continuous image recording and reproduction.

These objects of the present invention can be attained by an ultrafast continuous imaging apparatus comprising a camera portion and an image-receiving portion. Specifically, the camera portion comprises an image pickup tube that deflects and scans electron beams and allows electron signals corresponding to one pixel or a one-dimensional array of pixels to be converted successively and continuously to time-series light signals. The image-receiving portion comprises a means that converts to electron beams the time-series light signals transmitted from the pickup tube through at least one optical fiber and which reproduces an image by deflecting the electron beams in synchronism with the camera portion.

BRIEF DESCRIPTION OF THE DRAWINGS

FIG. 5 is a diagram showing the waveforms of signals produced at various stages of the image-receiving portion of the apparatus of the present invention.

DETAILED DESCRIPTION OF THE INVENTION

Embodiments of the present invention will be described hereinafter with reference to the accompanying drawings.

Figure 1:
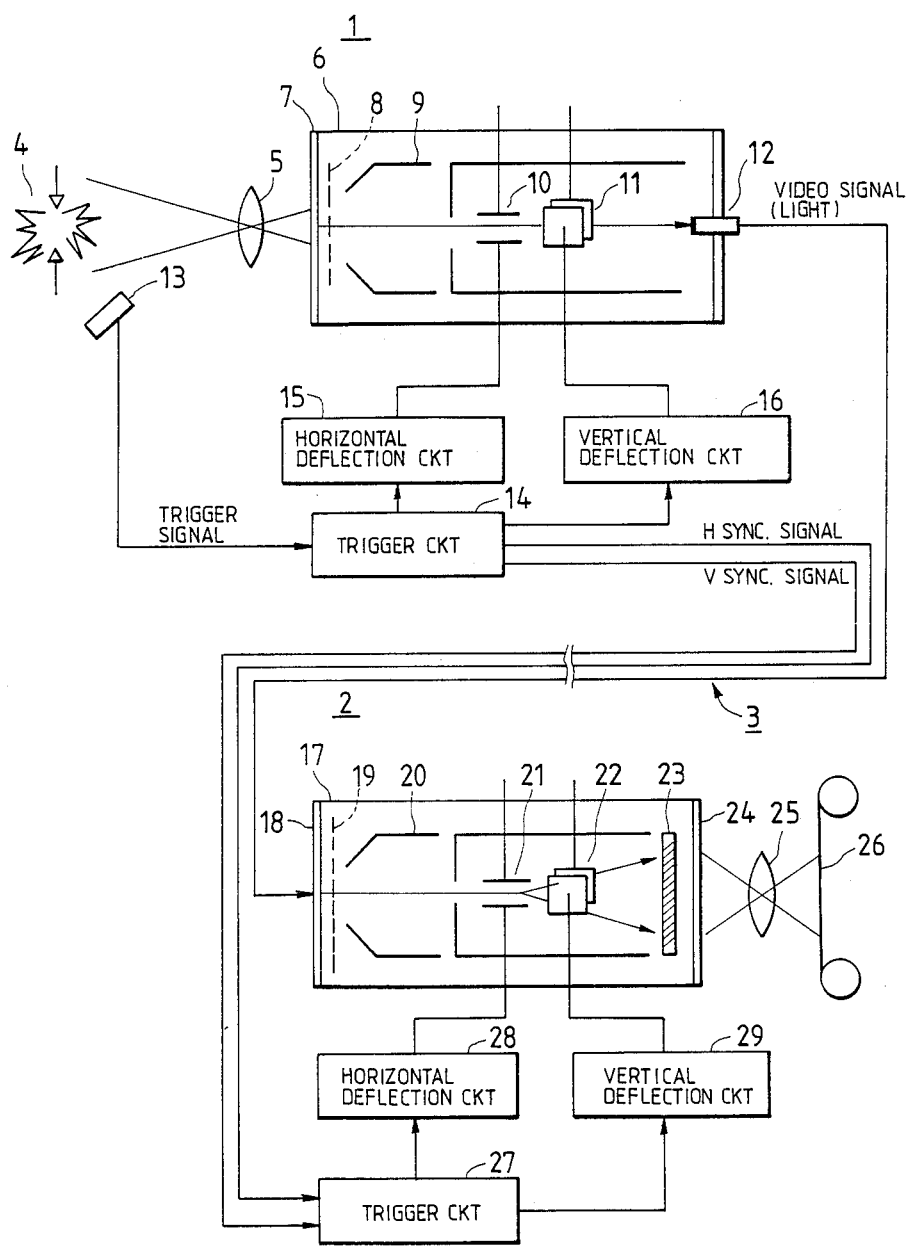
FIG. 1 shows schematically an ultrafast continuous imaging apparatus according to one embodiment of the present invention.

FIG. 1 shows schematically an ultrafast continuous imaging apparatus according to one embodiment of the present invention. The apparatus shown in FIG. 1 basically comprises a camera portion 1, an image-receiving portion 2 and an optical fiber assembly 3. FIG. 1 further includes: an object to be observed 4 such as the phenomenon of an explosion; a lens 5; an image pickup tube 6; the photocathode 7 of the image pickup tube; a mesh electrode 8; a focusing electrode 9; a horizontal (H) deflecting electrode 10; a vertical (V) deflecting electrode 11; a converter 12 for converting electron beams to light signals; a photodiode 13 for detecting a change in the object 4 and sending a trigger signal; a trigger circuit 14; a horizontal (H) deflecting circuit 15; and a vertical (V) deflecting circuit 16. The image-receiving portion 2 comprises an image-converter tube 17, a photocathode 18 for converting light signals to electron beams, a mesh electrode 19, a focusing electrode 20, a horizontal deflecting electrode 21, a vertical deflecting electrode 22, a micro-channel plate (MCP) 23, a phosphor screen 24, a lens 25, a recording device 26, a trigger circuit 27, a horizontal deflecting circuit 28, and a vertical deflecting circuit 29.

The converter 12 has an electron beam detecting surface and is capable of fast response for converting incident electron beams to light signals. The converter 12 may comprises any of the following: (1) a phosphor; (2) a scintillator; (3) the crystal of a compound semiconductor such as GaInP, GaAs or the like that produces electron beam excited photoluminescence as output light; (4) a photodiode having sensitivity to electron beams in combination with an LED, a semiconductor laser or the like; (5) the combination of an electron multiplier and an LED, a semiconductor laser or the like; and (6) an electron beam excitable LED, a semiconductor laser or the like. Each of the converter 12 and the optical fiber assembly 3 serving as an output line may be one in number. Alternatively, they may be more than one in number and arranged parallel to the direction of H (horizontal) deflection.

The imaging operation of the apparatus shown in FIG. 1 will be described hereinunder.

Figure 2:
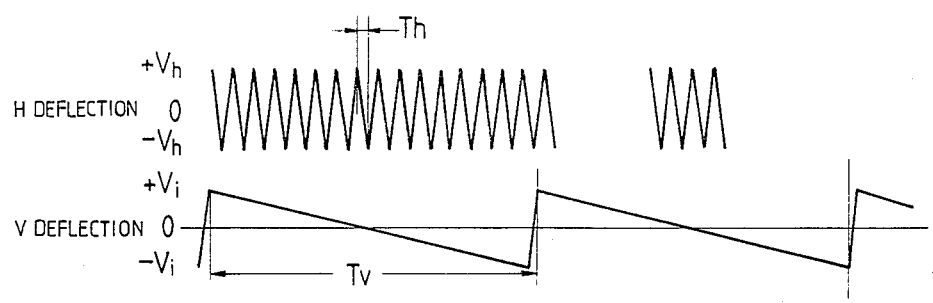
FIG. 2 shows an example of the waveforms of horizontal and vertical deflecting signals.

Light from the object to be observed 4, which is assumed here to be the phenomenon of an explosion and is momentarily changed, is incident on the photocathode 7, allowing light signals to be converted to electron beams. The electron beams thus produced are deflected and scanned as they pass through the mesh electrode 8, focusing electrode 9, horizontal (H) deflecting electrode 10 and the vertical (V) deflecting electrode 11 to the converter 12. When the scanned electron beams enter the converter 12, they are reconverted to a light signal corresponding to one pixel or a one-dimensional array of pixels, thereby producing a video signal which is transmitted to the image-receiving portion 2 through the optical fiber assembly 3 serving as an output line. The horizontal deflecting electrode 10 and the vertical deflecting electrode 11 are so designed that the start of the phenomenon 4 is detected with the photodiode 13, producing a trigger signal in the trigger circuit 14 which starts the deflecting operation of the deflection circuits 15 and 16. As shown in FIG. 2, horizontal (H) deflection is performed with a deflection voltage of a triangle waveform whereas vertical (V) deflection is accomplished with a deflection voltage of a sawtooth waveform. If the waveform of a horizontal deflection voltge has one period (Th) of 100 ns and that of a vertical deflection voltage has one period (Tv) of 10 μs, then a horizontal deflection component has a frequency (fh) of 5 MHz and a vertical deflection component has a frequency (fv) of 100 kHz. It is required in order to achieve synchronism between horizontal and vertical deflections that fh must be an integral multiple of fv.

The advantage of performing horizontal deflection with triangle waves is that high-speed image can be produced. In the example shown above, the number of horizontal scanning lines obtained per frame of image is 100 since the use of triangle waves permits sweeping in two opposite directions. It should also be noted that in this example, the imaging speed is 100 kHz ($10^5$ frames/sec), whichis at least 3,000 times as fast as the frame rate (30 Hz) that is achievable with standard TV cameras.

If even faster imaging operation is necessary, horizontal deflection needs to be effected with sine waves. In this case, the amplitude of the voltage required of horizontal deflection is set to approximately 600 $V_{p-p}$, which can be obtained with an LC resonant circuit. Horizontal deflection frequencies of up to about 100 MHz are readily available, and with 100 horizontal scanning lines per pixel, the vertical deflection frequency is 2 MHz. It therefore becomes possible to realize ultrafast imaging at a frame rate of 2 MHz.

The output light (video signal) from the converter 12 is transmitted to the image-receiving portion 2 through optical fibers. At the same time, horizontal and vertical sync signals may be transmitted in superposition on the same optical fibers. Needless to say, horizontal deflection can be omitted in a circuit configuration in which signal transmission is effected over a plurality of converters 12 and optical fibers 3 arranged parallel to the direction of horizontal deflection.

The video signal transmitted to the image-receiving portion 2 through the optical fiber 3 is imaged as a small spot on the photocathode 18 of the image-converter tube 17, whereupon the light signal is reconverted to electron beams. The resulting electron beams are converged as they pass through the mesh electrode 19 and the focusing electrode 20, and then are swept horizontally with the horizontal deflecting electrode 21 and vertically with the vertical deflecting electrode 22. The swept electron beams are passed through the microchannel plate (MCP) 23 and an image thereof is displayed on the phosphor screen 24. The displayed image is enlarged or reduced by means of the lens 25 and recorded on the recoding device 26.

Figure 4:
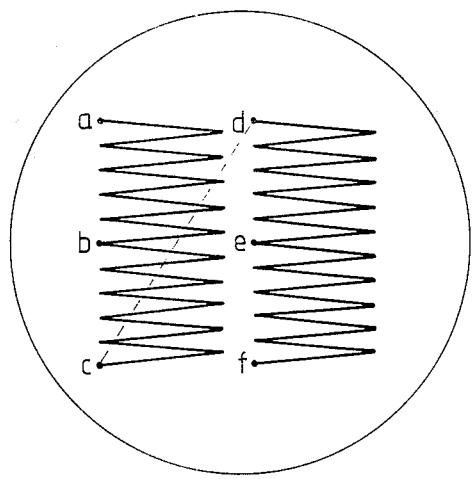
FIG. 4 is a diagram showing the tracing of electron beams on the phosphor screen of an image-converter tube.

The tracing of electron beams on the phosphor screen 24 is as shown in FIG. 4, and the waveforms of deflection voltages produced in response to the horizontal and vertical deflecting signals transmitted through the optical fiber 3 are as shown in FIG. 5.

The operation of the image-receiving portion 2 will be described hereinafter with reference to FIGS. 4 and 5.

Horizontal deflection is constantly performed in synchronisum with a horizontal (H) trigger signal (high-speed component). When a vertical (V) trigger signal is supplied, vertical deflection is started and at the same time, the blanking period is terminated (as indicated by point a in FIG. 5). Blanking may be performed on either the photocathode 18 or MCP 23 or both thereof. Blanking can also be effected with an optical shutter being provided in the path of the optical fiber 3.

When a predetermined vertical and horizontal scanning is completed (as indicated by point b in FIG. 5) to produce the first frame of image, the vertical deflection is terminated at zero volts and a blanking period starts. When a trigger signal for the second frame of image is subsequently supplied from the trigger circuit 27, vertical deflection is performed in the minus direction starting at zero volts (as indicated by point c in FIG. 5). When the reproduction of the second frame of image is complete, a stepped shift voltage (low-speed component) is superposed on the horizontal deflection voltage, causing electron beams to be shifted to point d in FIG. 5. The same procedures are subsequently repeated for reproducing the third and fourth frames of image.

In the example as shown above, image is transmitted through a single optical fiber. However, as already mentioned, if a plurality of output optical fibers 3 are arranged in the camera portion 1, a high-speed component is not necessary for horizontal deflection and therefore only a shift voltage (low-speed component) will suffice.

The MCP 23 dispersed just in front of the phosphor screen 24 of the image-converter tube 17 may also be employed for the purpose of performing a blanking operation. If desired, electron beams produced in response to weak light signal may be amplified and the output of the MCP is combined with the high voltage applied to the phosphor screen so as to accelerate the amplified electron beams, which are then allowed to impinge upon the phosphor screen to accomplish highly sensitive reproduction of image.

The multi-frame image reproduced on the phoshpor screen 24 is either recorded on the recording device 25 such as a photographic film or picked up with a TV camera and recorded in a digital frame memory for subsequent analysis.

The foregoing description assumes the use of an image-converter tube as the image-receiving portion. Another example of the image-receiving portion is shown in FIG. 3.

Figure 3:
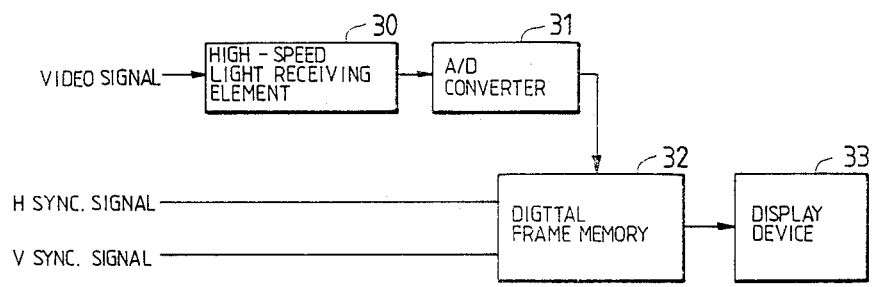
FIG. 3 shows schematically the composition of the image-receiving portion of an ultrafast continuous imaging apparatus according to another embodiment of the present invention.

The system shown in FIG. 3 comprises a high-speed light-receiving device 30 such as a high-speed photodiode which receives as an input a video signal supplied from the camera portion 1 through the optical fiber 3, an A/D converter 31, a digital frame memory 32 for recording the digital signal from the A/D converter 31 in synchronism with horizontal and vertical sync signals, and a display unit 33.

Assume here that a horizontal deflection signal of triangle wavedorm is employed. Also assume that the waveform of a horizontal deflection voltge has one period (Th) of 100 ns and that of a vertical deflection voltage has one period (Tv) of 10 μs as show in FIG. 2. If the number of horizontally scanned pixels is 100, the time resolution that can be achieved per pixel is 1 ns (100 ns/100). this means that if the A/D converter 31 is capable of operating at a frequency of as high as about 1 GHz, imaging can be accomplished at a frame rate which is at least 3,000 times as fast as the rame (30 Hz) achieveable with standard TV cameras. This operating speed is within the range practically feasible with currently available technology.

If even faster imaging is desired, one may perform horizontal deflection with sine waves at a frequency of 200 MHz, which 100 pixels being horizontally scanned. Under these conditions, the time resolution that can be achieved per pixel is 50 ps (5 ns/100). Therefore, by using an A/D converter of about 20 GHz (i.e. a conversion time of 50 ps), ultrahigh-speed imaging can be realized at a frame rate of 2 MHz. A single A/D converter is not available for achieving such a high frame rate, but a method of connecting ultrafast A/D converters parallel to each other or other methods can perform such a high frame raate.

As described above, the apparatus of the present invention is capable of very fast imaging at a frame rate within the range of 100 kHz to 2 MHz, which is outstandingly higher than the values attainable with conventinal TV cameras or high-speed imaging apparatus in which a two-dimensional solid-state image pickup device is divided into a plurality of segments for parallel reading. As a result, the ultrafast continuous imaging apparatus of the present invention has the ability to achieve faithful imaging of an object to be observed even if it is a momentarily changing phenomenon such as an explosion. Furthermore, this apparatus allows the produced image to be received in a remote area, with the attendant advantage of realizing continuous image recording and reproduction.

What is claimed is:

1. An ultrafast continuous imaging apparatus comprising:
    image pickup means for converting light from an object to first electron beams, deflecting said first electron beams to produce electron signals corresponding to pixel groups each comprising at least one pixel and successively and continuously converting said electron signals to time-series light signals, and
    image receiving means for converting said time-series light signals to second electron beams, deflecting said second electron beams in synchronism with said image pickup means and converting said deflected second electron beams to a reproduced image.

2. An apparatus according to claim 1, wherein said image-receiving means comprises an image-converter tube.

3. An apparatus according to claim 1, wherein said image-receiving means comprises a high-speed light-receiving device, an A/D converter and a digital frame memory.

4. An apparatus according to claim 1, wherein each of said pixel groups comprises a one-dimensional array of pixels.

5. An apparatus according to claim 1, said apparatus further comprising light guiding means for leading said time-series light signals from said image pickup means to said image receiving means.

6. An apparatus according to claim 5, wherein said light guiding means comprises at least one optical fiber, one end of said optical fiber being connected to the output portion of said image pickup means and the other end thereof being connected to the input portion of said image receiving means.

* * * * *